United States Patent [19]
Godfried

[11] 3,981,832
[45] Sept. 21, 1976

[54] FIRE-PROTECTING EPOXY RESINS

[75] Inventor: Leo M. Godfried, Badhoevedorp, Netherlands

[73] Assignee: Fokker-V.F.W. B.V., Schiphol-Oost, Netherlands

[22] Filed: July 12, 1974

[21] Appl. No.: 488,007

Related U.S. Application Data

[62] Division of Ser. No. 220,431, Jan. 24, 1972, Pat. No. 3,839,239.

[30] Foreign Application Priority Data

Feb. 11, 1971 Netherlands................... 7101806

[52] U.S. Cl. .............. 260/2.5 EP; 106/15 FP; 252/4; 252/8.1; 260/6; 260/9; 260/2.5 FP; 260/28 P; 260/33.8 EP; 260/37 EP; 260/47 EP; 260/834; 260/DIG. 24; 428/417
[51] Int. Cl.² ............... C08J 9/02; C08G 53/08
[58] Field of Search............... 260/37 EP, DIG. 24, 260/47, 59, 2.5 EP, 2.5 FP, 45.7 P, 28

[56] References Cited

UNITED STATES PATENTS

| | | | |
|---|---|---|---|
| 3,013,049 | 12/1961 | Holtschmidt et al. | 260/2 N |
| 3,256,240 | 6/1966 | Smith | 260/47 EC |
| 3,312,636 | 4/1967 | Rizzo | 260/2 EC |
| 3,654,190 | 4/1972 | Levine | 260/45.7 P |

*Primary Examiner*—Murray Tillman
*Assistant Examiner*—T. Pertilla
*Attorney, Agent, or Firm*—Snyder, Brown & Ramik

[57] ABSTRACT

Glass fiber-reinforced epoxy resins are rendered fire-protecting by incorporating in their moulding compositions a combination of three materials: a source of carbon, such as e.g. pentaerythritol, a source of phosphoric acid, such as e.g. a water-insoluble nitrogen-containing polymer phosphate, and a source of non-inflammable gases such as e.g. melamine.

3 Claims, No Drawings

FIRE-PROTECTING EPOXY RESINS

This is a Divisional from Application Ser. No. 220,431 filed Jan. 24, 1972 and now U.S. Pat. No. 3,839,239.

This invention relates to epoxy resin moulding compositions and to epoxy resins and more particularly to such resins and compositions that have been rendered fire-protecting in a high degree.

Epoxy resin moulding compositions generally comprise an uncured epoxy resin, i.e. the reaction product of a poly-functional halohydrin and a polyhydric phenol, to which may have been added a suitable curing agent such as an amine, a polyamide or a carboxylic anhydride, and further, if desired, diluents, pigments, inert fillers, reinforcing fibers, modifying synthetic resins, accelerators and other conventional additives.

The combustability of such compositions and of the resins resulting therefrom is frequently reduced by adding halogen-containing and/or phosphorus-containing organic compounds. Such compounds have the disadvantage, however, that they will disappear eventually from the uncured or cured resin composition by means of diffusion. For the same purpose, a certain amount of halogen may be chemically built-in in the molecule of the uncured epoxy resin, e.g. as a substituent to the phenyl nuclei of the polyhydric phenol. In general, however, the melting point of the epoxy resin will be raised by this incorporation and as a result thereof, the uncured resin will frequently be solid at room temperature and can only be made up to a moulding composition with the aid of solvents. A third possibility is to build-in halogen atoms in the curing agent but in general the melting point of this curing agent will also be raised by this incorporation and as a result thereof, the compatibility of the agent with the resin is diminished.

Thus, in the field of epoxy resin moulding compositions, there is still a need for fire-protecting additives that do not have the disadvantages of the aforesaid additives or chemical components. Apart therefrom it should be remarked that the aforesaid additives and components will at most lead to moulding compositions and resins which are more or less self-extinguishing or flame-resistant when exposed to fire. For many utilisations, however, there is a constant need for additives that are capable of rendering the moulding compositions and the end products completely incombustible.

In accordance with the invention, it has now been found that epoxy resins may be rendered fire-protecting in a higher degree than before by incorporating in their moulding compositions a combination of three materials that may be indicated as a source of carbon, a source of phosphoric acid and a source of non-inflammable gases. When the resins made from such compositions are exposed to high temperatures or even to an open fire, they will superficially give rise to the production of bubbles and foam, thus resulting in a multicellular foam layer at their surface and such a foam layer will isolate the underlying portions of the resins from combustion.

An object of the invention is to provide an epoxy moulding composition, essentially comprising an uncured epoxy resin together with a source of carbon, a source of phosphoric acid and a source of non-inflammable gases.

A further object of the invention is to provide fire-protecting epoxy resins obtainable from such a moulding composition by moulding and curing and essentially comprising a cured epoxy resin having a source of carbon, a source of phosphoric acid and a source of non-inflammable gases incorporated therein throughout its mass.

A combination of the three aforesaid materials has been used already earlier in paints (so-called intumescent coatings) but the use thereof in epoxy resin moulding compositions and consequently their use throughout the mass of an epoxy resin has never been proposed before.

In the moulding compositions of the invention, any uncured epoxy resin may be used that is conventional in the art. In most cases, it will be an epoxy resin from epichlorohydrin and diphenylol propane, but other epoxy resins from polyfunctional halohydrins and polyhydric phenols are also suitable. Previous building-in of a halogen such as bromine in the polyhydric phenol will be helpful in rendering the end product fire-protecting although it has a tendency to raise the melting point of the epoxy resin and thereby to reduce the processability of the composition. Should the uncured epoxy resin be solid at room temperature, then a diluent should be added for obtaining a good consistency. It is preferred, however, to use an uncured epoxy resin which is liquid or viscous at room temperature.

The curing agent to be added may be a compound that provokes curing already at room temperature, such as a polyamine, a polyamide, or polysulfide, but it may also be a compound which is effective at elevated temperatures such as e.g. a carboxylic acid, a carboxylic anhydride, a sterically hindered polyamine, a urea resin or a melamine resin. A halogen, chemically built-in in the curing agent may be helpful in making the end product fire-protecting but it also has a tendency to raise the melting point of the agent and therefore, it is mostly omitted. The curing agent should in any case be well compatible with the uncured epoxy resin. Triethylene tetramine is preferred as a cold-curing agent and diaminediphenyl methane or methylnadic anhydride is preferred as a hot curing agent.

In addition to the uncured epoxy resin and the curing agent, diluents, pigments, inert fillers, reinforcing fibers, modifying synthetic resins, accelerators and the like may be incorporated in the moulding composition, in any combination and any ratio that is conventional in the art. Thus, it is advisable to add an accelerator such as tri(dimethylaminomethyl)phenol when methylnadic anhydride is used as a curing agent.

The fire-protecting additives to be used in the invention comprise a source of carbon, a source of phosphoric acid and a source of non-inflammable gases.

The carbon source will generally be a material having many radicals capable of entering into an esterifying reaction with phosphoric acid, said material having a high carbon content and decomposing at higher temperatures than the phosphoric acid source. Typical examples thereof are starch, casein and polyvalent alcohols such as pentaerythritol. Mono-, di- and tripentaerythritol and mixtures thereof are preferred.

The phosphoric acid source may be any material that decomposes at elevated temperatures (lower than those of the carbon source), thereby generating phosphoric acid. Typical examples are ammoniumorthophosphate, melamine phosphate and polyphosphoryl phosphate. The preferred phosphoric acid source is a commercially available nitrogen-containing polymer phosphate which comprises more phosphoric acid than other similar materials and which is moreover water-insoluble.

The source of non-inflammable gases will generally be an amine or amide, such as e.g. dicyanodiamide, urea, melamine and/or guanidine. These substances should be selected in such a way that they do not take part in the curing of the epoxy resin but remain in free state in the resin in order to be available for providing non-inflammable gases at any time. The effect of these amines or amides may be increased by halogen atoms, such as bromine atoms, that have been built-in chemically in the molecule of the epoxy resin or the curing agent because such halogen atoms may also serve as a source for non-inflammable gases. In some cases, e.g. if the curing agent is a carboxylic acid or carboxylic anhydride, the amines or amides may be used together with chlorinated paraffins such as chlorinated naphthalene, which will decompose at higher temperatures than the amines or amides and will also serve as a good source for non-inflammable gases. In general, such chlorinated paraffins cannot be used together with an amine curing agent because the moulding composition will be cured too fast then.

The concentrations of the several fire-protecting additives in the invented moulding composition, as well as their mutual ratios are not critical. The time and sequence of adding these materials to the other components of the composition are not essential either, although it is preferred to incorporate the carbon source, the phosphoric acid source and the source of non-inflammable gases prior to admixing the curing agent to the composition.

After forming the invented moulding composition, this composition may be subjected to moulding and curing operations. Thus, the moulding composition may be introduced into a mould and may be cured therein in a conventional way to form massive or hollow articles. The fire-protecting additives are integrated completely then in the mass of epoxy resin constituting such articles.

As an alternative to the above moulding method, the moulding composition may be laminated with one or more layers of glass fiber reinforcements and cured to form a fire-protecting epoxy resin-glass fiber laminate.

Another possibility is to form sandwich panels having a core of foam plastic or honey-comb material or another suitable core material and skin sheets of fire-protecting glass-fiber-reinforced epoxy resin. In that case, it will be advantageous first to impregnate glass fibers with an invented moulding composition in which the curing agent is only operative at elevated temperatures, then to apply the resulting sheets of impregnated glass fibers to either side of a core material and thereafter introducing the whole combination into a mould and curing it by means of heat and pressure.

The epoxy resins and articles produced from the invented moulding compositions are suitably protected against fire and other ways of excessive heating, thanks to the combination of three materials incorporated therein. Although the invention is not to be restricted by any theoretical explanation of the fire-protecting effect, it is assumed that the phosphoric acid source will decompose first during excessive heating and will liberate phosphoric acid which reacts immediately with the carbon source to form a rather complex ester. Thereupon, the ester will decompose and form a big volume of carbon, additional water, carbon dioxide and non-inflammable gases. Moreover, phosphoric acid is recovered and this may enter again into an esterifying reaction with the carbon source. Simultaneously with the ester, the gas-forming materials will decompose and will liberate big volumes of non-inflammable gases. The result is a bubbling and boiling mass which develops a multicellular foam, said foam forming a thick insulating layer and protecting the underlying portions against further attack.

The invention is of great advantage to epoxy resin articles that should satisfy high standards of security, e.g. aircraft parts, automobile parts, housing walls and plant walls.

EXAMPLE 1

A mixture is made from 400 grams of Araldite F (an epoxy resin made from epichlorohydrin and diphenylol propane and having an epoxy value of 180 to 195; available from CIBA), 130 grams of dipentaerythritol, 205 grams of Phos-Chek P/30 (a nitrogen-containing polymer phosphate available from Monsanto), 190 grams of melamine and 75 grams of methyl ethyl ketone (diluent). The resulting non-cured epoxy resin composition (1000 grams) is a viscous opalescent product which is stable for 6 to 12 months at room temperature (20°C).

The composition is completed for moulding by adding 10 parts by weight of Epikure RTU (a curing agent of the amine-adduct type, comprising about 90% of triethylene tetramine dissolved in about 10% of epoxy resin made from epichlorohydrin and diphenylol propane and available from Shell) to 100 parts by weight of the aforesaid mixture and thoroughly mixing these components with each other. The resulting moulding composition has a pot life of at least 20 minutes at room temperature.

The moulding composition is laminated with one or more layers of glass fiber reinforcement in such a way that the resulting laminate has an epoxy resin layer of at least 400 grams/m$^2$ at one side, and thereupon the laminate is allowed to cure. After 6 hours at room temperature, the layer of epoxy resin is free from tackiness although the curing operation will last for at least 2 × 24 hours.

If the epoxy resin side of the resulting laminate is exposed to an open fire or to heat radiation sources having temperatures up to 1400°C it will spontaneously form an incombustible, insulating foam mass which insulates the remainder of the laminate against decomposition and combustion. The foaming surface is uniform and closed. The resulting foam mass is homogeneous.

EXAMPLE 2

In the same way as described in Example 1, a mixture of uncured epoxy resin (epoxy value 180 to 190) with fire-protecting additives and a diluent is made. This mixture is stable for 6 to 12 months at room temperature.

A moulding composition is made by adding 11 parts by weight of DDM curing agent (a curing agent based on diamino diphenyl methane and operative at elevated temperatures) to 100 parts by weight of the aforesaid mixture and thoroughly mixing these components with each other. The resulting moulding composition has a pot life of about 1 week at room temperature.

The moulding composition is applied to a glass fiber mat (30% or more by weight, based on the moulding composition) and rolled into this mat, thus causing a good impregnation of the fibers with the moulding composition. The resulting impregnated fiber mat is stored as a semi-finished product.

Later on, a sandwich panel is made from two of these impregnated fiber mats by applying them as skin sheets onto a core of foam material, introducing the combination into a mould and curing the combination by means of heat and pressure. At 180°C, curing is completed in 10–20 minutes. The end product obtained from the mould has similar fire-protecting characteristics as the laminate of Example 1.

EXAMPLE 3

In the same way as described in Example 1, a mixture of uncured epoxy resin (epoxy value 180 to 195) with fire-protecting additives and a diluent is made. This mixture is stable for 6 to 12 months at room temperature.

The mixture is completed for moulding by adding about 39 parts by weight of MNA (methylnadic anhydride, a curing agent operative at elevated temperatures) and about 0.8 parts by weight of DMP 30 (tri(-dimethylamino-methyl)phenol as an accelerator, available from Rohm & Haas) to 100 parts by weight of the aforesaid mixture and thoroughly mixing these components with each other. The resulting moulding composition has a pot life of about 3 months at room temperature or about 5 months at 5°C.

The moulding composition is applied to a glass fiber mat (about 30% by weight, based on the moulding composition) and rolled into that mat so as to cause a good impregnation of the fibers with the moulding composition. The impregnated mat is stored as a semi-finished product.

Later on, a sandwich panel is made from two of these impregnated mats by applying them as skin sheets onto a core of foam material and introducing the combination into a mould and curing the combination by means of heat and pressure. A stepped heating and cooling program is used in order to prevent distortion. This program comprises e.g. first a period of about 90 minutes or longer for raising the temperature from 20° to 120°C, then 2 hours of heating at 120°C, then 60 minutes of raising the temperature from 120° to 180°C, then 2 hours of heating at 180°C, thereafter gradually cooling to 150°C and finally a forced cooling to room temperature.

The end product as obtained from the mould has similar fire-protecting characteristics as the laminate of Example 1.

What I claim is:

1. A fire-protecting epoxy resin, essentially comprising a cured product of an epoxy resin made from a polyfunctional halohydrin and a polyhydric phenol and cured with a curing agent selected from the group consisting of polyamines and carboxylic anhydrides, said cured epoxy resin having a source of carbon, a source of phosphoric acid and a source of non-inflammable gases incorporated therein throughout its mass, said source of carbon having a high temperature of decomposition and containing many radicals capable of entering into an esterifying reaction with phosphoric acid, said carbon source being polyvalent alcohol, said source of phosphoric acid being a phosphate compound having a selected decomposition temperature lower than that of said source of carbon to generate phosphoric acid whereby said esterifying reaction may take place at said selected temperature and being selected from the group consisting of ammonium orthophosphate, melamine phosphate, polyphosphoryl phosphate, and water-insoluble ammonium polyphosphate with a phosphate content of about 90%, and said source of non-inflammable gases being a compound which does not take part in the curing of the epoxy resin but remains in free state therein and provides non-inflammable gases at temperatures above said selected temperature and said source of non-inflammable gases being selected from the group consisting of dicyanodiamide, urea, melamine, guanidine and a combination thereof with chlorinated paraffin, and said fire-protecting epoxy resin further comprising a glass fiber reinforcement.

2. The fire-protecting epoxy resin as claimed in claim 1, wherein said curing agent is a carboxylic anhydride.

3. The fire-protecting epoxy resin as claimed in claim 1, wherein said source of carbon is selected from the group consisting of mono-pentaerythritol, di-pentaerythritol, tri-pentaerythritol, and mixtures thereof.

* * * * *